(12) United States Patent
Schreckenberg et al.

(10) Patent No.: US 12,217,427 B2
(45) Date of Patent: Feb. 4, 2025

(54) METHOD OF VISUALIZING A DYNAMIC ANATOMICAL STRUCTURE

(71) Applicant: KONINKLIJKE PHILIPS N.V., Eindhoven (NL)

(72) Inventors: Marcus Schreckenberg, Freising (DE); Niklas Hitschrich, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 713 days.

(21) Appl. No.: 17/423,157

(22) PCT Filed: Jan. 10, 2020

(86) PCT No.: PCT/EP2020/050604
§ 371 (c)(1),
(2) Date: Jul. 15, 2021

(87) PCT Pub. No.: WO2020/148195
PCT Pub. Date: Jul. 23, 2020

(65) Prior Publication Data
US 2022/0130046 A1    Apr. 28, 2022

(30) Foreign Application Priority Data

Jan. 17, 2019    (EP) .................................... 19152222

(51) Int. Cl.
*G06T 7/00*    (2017.01)
*G06T 7/11*    (2017.01)
(Continued)

(52) U.S. Cl.
CPC ............. *G06T 7/0016* (2013.01); *G06T 7/11* (2017.01); *G06T 15/08* (2013.01); *G06T 19/006* (2013.01);
(Continued)

(58) Field of Classification Search
None
See application file for complete search history.

(56) References Cited

U.S. PATENT DOCUMENTS 8,103,070 B2    1/2012    Roberts
11,207,133 B1 *  12/2021    Douglas .................. G06T 19/20
(Continued)

FOREIGN PATENT DOCUMENTS

CN    103236058 A  *  8/2013
CN    103429164 A  *  12/2013
(Continued)

OTHER PUBLICATIONS

International Search Report and Written Opinion of PCT/PCT/EP2020/050604, dated Mar. 20, 2020.
(Continued)

*Primary Examiner* — Fan Zhang

(57) ABSTRACT

The invention relates to a method of visualising a dynamic anatomical structure (1), a computer program and a user interface. The method comprises (a) providing a sequence of three-dimensional medical images (M1, M2, M3, . . . MZ) of a dynamic anatomical structure (1) spanning a time period (T), (b) providing a dynamic model (14), in particular surface of the anatomical structure, (c) determining a volume of interest (40) containing an anatomical feature of interest (3) within each of the three-dimensional images, wherein the volume of interest (40) follows the position and/or the shape of the anatomical feature of interest (3) across the time period and wherein the volume of interest (40) is smaller than the complete field of view of the three-dimensional medical images (M1, M2, M3, . . . MZ), and (d) providing a three-dimensional visualisation environment (50, 70), wherein a visualisation (45) corresponding to a particular point in time comprises (i) a volume rendering of the volume of interest (40) of the three-dimensional (Continued)

image; and (ii) a visualisation of the dynamic model (14) in the same coordinate system. Preferably, the three-dimensional visualisation environment (50, 70) allows for displaying the dynamic model (14) and the volume rendered volume of interest (40) for each three-dimensional image across the time period in cine mode.

20 Claims, 7 Drawing Sheets

(51) Int. Cl.
G06T 15/08 (2011.01)
G06T 19/00 (2011.01)
G06V 10/25 (2022.01)
G06V 10/62 (2022.01)

(52) U.S. Cl.
CPC .............. *G06V 10/25* (2022.01); *G06V 10/62* (2022.01); *G06T 2207/10016* (2013.01); *G06T 2207/10076* (2013.01); *G06T 2207/30048* (2013.01); *G06V 2201/031* (2022.01)

(56) References Cited

U.S. PATENT DOCUMENTS

| | | | |
|---|---|---|---|
| 11,801,114 B2* | 10/2023 | Lang | A61B 90/98 |
| 2005/0253841 A1 | 11/2005 | Brabec | |
| 2008/0194957 A1 | 8/2008 | Hoctor | |
| 2011/0103661 A1 | 5/2011 | Schummers | |
| 2011/0107270 A1* | 5/2011 | Wang | G16H 20/40 703/11 |
| 2011/0201915 A1 | 8/2011 | Gogin et al. | |
| 2014/0052001 A1 | 2/2014 | Ionasec | |
| 2015/0140535 A1 | 5/2015 | Geri et al. | |
| 2016/0125640 A1 | 5/2016 | Lee et al. | |
| 2016/0220311 A1 | 8/2016 | Mansi | |
| 2017/0084023 A1 | 3/2017 | Wachter-Stehle | |

FOREIGN PATENT DOCUMENTS

| | | | |
|---|---|---|---|
| CN | 106600596 | * | 7/2019 |
| JP | 2001128982 A1 | | 5/2001 |
| JP | 2012217780 A | | 11/2012 |

OTHER PUBLICATIONS

Sorensen, Thomas Sangild et al "A New Virtual Reality Approach for Planning of cardiac Interventions", Artificial Intelligence in Medicine, vol. 22, 2001, pp. 193-214.

Lin, Wei-te et al "Visualization of Cardiac Dynamics using Physics-based Deformable Model", Medical Imaging Image Display and Visualization, vol. 3976, 2000.

Linte, Cristian A. et al "Virtual Reality-Enhanced Ultrasound Guidance: A Novel Technique for Intracardiac Interventions" Computer Aided Surgern, vol. 13, No. 2, Mar. 2008, pp. 82-94.

Peters, Terry M. et al "Towards a Medical Virtual Reality Environment for Minimally Invasive Cardiac Surgery", MIAR 2008, Incs 5128, pp. 1-11.

Abiri, Arash et al "Simulating Developmental Cardiac Morphology in Virtual Reality Using a Deformable Image Registration Approach", Annals of Biomedical Engineering, 2018.

Noorani, Alia et al "Challenges in valve-in-valve therapy," J. Thorac. Dis., vol. 7, No. 9, pp. 1501-1508, 2015.

Dvir, Danny et al "Transcatheter Aortic Valve-in-Valve Implantation for Patients With Degenerative Surgical Bioprosthetic Valves," Curr. Probl. Cardiol., vol. 39, No. 1, pp. 7-27, 2014.

Mahmood, Feroze. et at, "Three-dimensional printing of mitral valve using echocardiographic data," JACC Cardiovasc. Imaging, vol. 8, No. 2, pp. 227-229, 2015.

D. Dvir and J. Webb, "Mitral valve-in-valve and valve-in-ring: Technical aspects and procedural outcomes," EuroIntervention, vol. 12, pp. Y93-Y96, 2016.

Biaggi, Patric et al "Hybrid Imaging During Transcatheter Structural Heart Interventions," Curr. Cardiovasc. Imaging Rep., vol. 8, No. 9, 2015.

Wilbring, Manuel et al "Transapical Transcatheter Valve-in-Valve Implantation for Deteriorated Mitral Valve Bioprostheses," Ann Thorac Surg, vol. 95, pp. 111-118, 2013.

Bartel, Thomas, "Three-dimensional printing for quality management in device closure of interatrial communications," Eur. Hear. J.—Cardiovasc. Imaging, 2016.

Brezezinski, M. et al "The New 3D Printed Left Atrial Appendage Closure with a Novel Holdfast Device: A Pre-Clinical Feasibility Animal Study," PLoS One, vol. 11, No. 5, 2016.

Olivieri, Laura J. "Three-dimensional printing of intracardiac defects from three-dimensional echocardiographic images: Feasibility and relative accuracy," J. Am. Soc. Echocardiogr., vol. 28, No. 4, pp. 392-397, 2015.

* cited by examiner

METHOD OF VISUALIZING A DYNAMIC ANATOMICAL STRUCTURE

CROSS-REFERENCE TO PRIOR APPLICATIONS

This application is the U.S. National Phase application under 35 U.S.C. § 371 of International Application No. PCT/EP2020/050604, filed on Jan. 10, 2020, which claims the benefit of European Patent Application No. 19152222.6, filed on Jan. 17, 2019. These applications are hereby incorporated by reference herein.

FIELD OF THE INVENTION

The present invention relates to a method of visualising a dynamic anatomical structure, to a related computer program and a user interface.

BACKGROUND OF THE INVENTION

Medical imaging techniques provide three-dimensional (3D) image data of the human or animal body. However, the images are usually viewed on two-dimensional (2D) screens. Therefore, there is an omnipresent risk to misinterpret the relative spatial relationships between anatomical structures represented on medical 3D data, when 3D data sets are viewed and analysed in orthogonal planes on 2D screens. A frequent source of error is the selection of an incorrectly placed or twisted measuring plane for analysing and taking measurements of an anatomical structure.

3D volume rendering is a set of techniques used to display a 2D projection of a 3D image data set. However, although 3D volume rendering is helpful in forming a mental 3D model of the anatomy, it is strongly dependent on the image quality, as well as on the selected settings (threshold, smoothing etc.). It often incorporates image errors and therefore carries the risk that the user no longer critically questions or verifies the volume-rendered representation of the anatomy. Nevertheless, the approach of segmenting a 3D volume with one or more threshold values is still interesting when used for a complex pathology (e.g. a tumour, ruptured chord or a calcified bioprosthesis).

On the other side, simplified models of anatomical structures enjoy a high reputation in the clinical practice, because they can compensate bad image quality and are easier and faster to interpret. An example for a dynamic surface model is the TOMTEC Beutel®, a feature of the commercially available software 4D LV-ANALYSIS© or 4D MV by TOMTEC Imaging Systems GmbH, which is a dynamic surface model of the right ventricular cavity. However, they are not suited for all pathologies, since complex and fine structures are not captured and displayed properly.

Accordingly, current approaches to segment and display medical image data of complex anatomical structures, for example cardiac 3D volume data, either simplify the anatomical characteristics too much by using surface or shape models, or use a threshold-based segmentation which can lead to false conclusions. Therefore, important geometrical correlations and information, which are necessary for example when planning heart interventions, might get lost or overlooked.

Some studies work with 3D printing of medical models based on CT or 3D Echo data. However, the 3D printing process takes a lot of time and expertise, is expensive, cannot be included into daily clinical routine, and dynamic movements of anatomical structures (especially for 3D Echo) cannot be represented.

Virtual reality (VR) has been used in visualising medical image data. For example, Thomas S. Sorensen et al. in "*A new virtual reality approach for planning of cardiac interventions*", Artificial Intelligence in Medicine 22 (2001), 193-2014, discloses a virtual reality visualisation of cardiac magnetic resonance (MR) data. The disclosed method includes an optimised, respiratory compensated 3D MR scanning, segmentation, model generation and an interactive, virtual reality visualisation. The segmentation resulted in a set of contours in parallel planes, defining different anatomical parts of a cardiovascular system. A 3D model was created by connecting these contours. The model was viewed using shutter glasses in combination with a "holobench", a setup of two displays angled 90° to each other.

Cristian A. Linte et al. in "*Virtual reality-enhanced ultrasound guidance: A novel technique for intracardiac interventions*", Computer Aided Surgery, March 2008, 13(2), 82-94, discloses a virtual reality environment for visualising real-time intra-operative echocardiography. Pre-operative images and the positions of magnetically tracked surgical instruments can be presented to the surgeon to augment intra-operative ultrasound images. The pre-operative images were registered with the intra-operative TEE (transesophageal echocardiography) data using a feature-based registration technique.

US 2014/052001 A1 discloses the use of both B-mode data representing tissue and flow data representing a regurgitant jet in order to detect the mitral valve automatically with a machine-learnt classifier. A series of classifiers may be used, such as determining a position and orientation of a valve region with one classifier, determining a regurgitant orifice with another classifier, and locating mitral valve anatomy with a third classifier. One or more features for some of the classifiers may be calculated based on the orientation of the valve region. Once the mitral valve is detected it is rendered as a mesh model and overlaid on a rendering of the heart.

US 2016220311 A1 discloses a processor that acquires image data from a medical imaging system. The processor generates a first model from the image data. The processor generates a computational model which includes cardiac electrophysiology and cardiac mechanics estimated from the first model. The processor performs tests on the computational model to determine outcomes for therapies. The processor overlays the outcome on an interventional image. Using interventional imaging, the first heart model may be updated/overlaid during the therapy to visualize its effect on a patient's heart.

US2008194957 A1 discloses a method for producing a three-dimensional image of an object. The method includes providing a model of the object, insonifying regions of the object from source transducers external to the object, receiving return echoes from the object at receiving transducers external to the object, processing the return echoes and generating a hybrid image of the object comprising object regions responsive to the model of the object and object regions responsive to the return echoes.

Lin W. et al. in "Visualisation of cardiac dynamics using physics-based deformable mode" visual communications and image processing; 20-1-2004-201-2004; San Jose, vol. 3976, 15 February 200 (2000-02-15), pages 210-217, XP008019251, DOI: 10.1117/12.383043 ISBN: 978-1-62841-730-2, discloses to create an image displaying the dynamic motion of the left ventricle. Therefore a first method according to which a surface model is crated is provid. Further, a second method according to which a physics-based deformable model in which a surface mesh is deformed by following the trajectory of connected corresponding vertices in successive time-point surface models is provided.

OBJECT OF THE INVENTION

It is therefore an object of the invention to provide a method of visualising a dynamical anatomical structure, which minimises the risk of misinterpretation the image data, and in particular the risk of misinterpreting or incorrectly measuring the relative spatial relationship between anatomical features.

SUMMARY OF THE INVENTION

To better address one or more of the above-identified concerns, according to a first aspect of the invention there is provided a method of visualising a dynamic anatomical structure. The method comprises the steps of
 a) providing a sequence of three-dimensional medical images spanning a time period, each three-dimensional medical image of the sequence showing a dynamic anatomical structure at a point in time during the time period;
 b) providing a dynamic model of at least a part of the anatomical structure, wherein the dynamic model has been derived from and is registered with the sequence of three-dimensional medical images;
 c) determining a volume of interest containing an anatomical feature of interest within each of the three-dimensional images, wherein the volume of interest follows the position and/or the shape of the anatomical feature of interest across the time period, and wherein the volume of interest is smaller than the complete field of view of the three-dimensional medical images; and
 d) providing a three-dimensional visualisation environment for displaying the dynamic anatomical structure across the time period, wherein a visualisation corresponding to a particular point in time within the time period comprises
  (i) a volume rendering of the volume of interest of the three-dimensional image corresponding to the particular point in time; and
  (ii) a visualisation of the dynamic model at the particular point in time and in the same coordinate system as the volume rendering of the volume of interest.

Preferably, the three-dimensional visualisation environment allows for displaying the dynamic model and the volume rendered volume of interest for each three-dimensional image across the time period in "cine mode", i.e. in "cinematic mode" or animation, which means that a sequence of visualisations is shown dynamically, at a frame rate of e.g. 5-100 visualisations per second.

Accordingly, the invention combines two important approaches when looking at medical 3D volume data: The first approach is a dynamic, computer-generated model of at least a part of an anatomical structure. Such models have the advantages that they show a simpler version/abstraction of the anatomy, make it easier to navigate and interpret the anatomy, are not very much dependent on the image quality, and they have no "holes", i.e. no incorporation of artefacts etc.

The second approach is volume rendering, which has the advantage that it is suitable for more complex/unusual anatomies or highly individual structures like valve leaflet cusps, stenosis, calcifications, bio-prostheses, ruptured chordae etc., which cannot be modelled by software like 4D MV by TOMTEC. Further, parameters like threshold, opacity, contrast can be adjusted "live", i.e. with immediate effect while watching a dynamic sequence of volume renderings. On the other hand, volume rendering is strongly dependent on the image quality and thus might be too complex for an easy interpretation The invention provides a combination offering the advantages of both approaches: Volume renderings is used only for those parts of the anatomy where it is really useful and necessary. The Region in which volume rendering is used (=VOI), can be minimized to the actual feature of interest, resulting in a better overview, without the feature of interest (e.g. valve) moving out of the focus. This may be done by using points of the dynamic model to adjust the position of the VOI also dynamically.

Accordingly, the invention provides an excellent overview and navigation opportunities offered by the dynamic model, e.g. a shape/surface model, in combination with the adjustable and highly individual benefits offered by volume rendering, while the volume rendering is only used where it is necessary.

The dynamic anatomical structure may be any moving object in the human or animal body. In particular, it is a structure affected by a cyclical movement, such as the respiratory motion or the heartbeat. Therefore, the method is particularly suitable for visualising anatomical structures within the torso, such as the heart, lungs, ribs, liver, kidneys etc. The anatomical structure may be an organ or part of an organ of the human or animal body such as heart, but may also be a blood vessel or a bone structure. The inventive method is particularly suited for hollow organs and organs comprising a cavity, such as the heart.

The dynamic anatomical structure is captured in a sequence of three-dimensional medical images obtained from a human subject spanning a time period, where the images may be pre-operative images, but may also be intra-operative images. A sequence of 3D medical images may be termed a 4D image. A three-dimensional (3D) image is usually a digital image, e.g. in DICOM standard, i.e. containing a three-dimensional array of voxels, each voxel containing a grey scale value. Such 3D medical images have typically been obtained from a field of view containing the dynamic anatomical structure using a medical imaging modality, such as MR, computed tomography (CT), positron emission tomography (PET) or ultrasound (US). When the anatomical structure is the heart, ultrasound and in particular transesophageal echocardiography (TEE) may be advantageously used. One 3D image from the time sequence of 3D images is also called a "frame" in the following. The 3D images may be acquired with a frame rate of e.g. 5-100, preferably 20-60 images per second, so as to allow a smooth representation of the dynamically moving anatomical structure, where it is displayed in cine mode. The time period is usually at least one cycle of the cyclical movement, e.g. at least one heartbeat.

The dynamic model of at least a part of the anatomical structure is in particular a simplification of the anatomical structure, for example a triangulated surface model of a particular interface within the anatomical structure, for example the blood-tissue interface of a blood vessel or a heart chamber. The model may comprise a number of points spanning a line or a surface for each frame. It may also be a mathematical model, for example a parametrised model, such as a surface or volume spanned by spline curves. The model is dynamic, i.e. it follows the movement of the anatomical structure across the time period. The purpose of the dynamic model is to visualise at least a part of the anatomical structure, for example one or several chambers of the moving heart, without obstructing the view of the user with too much detail. Therefore, such simplified models are useful in providing an orientation to the user, for example when planning an intervention or making measurements on a particular part of the anatomy.

The dynamic model may be extracted from 4D ultrasound image data, for example by a speckle tracking technique to automatically follow three-dimensional endocardial contours throughout a complete heart cycle, to thereby generate a dynamic surface model of one or several heart chambers, in particular the left ventricle and optionally at least part of the left atrium. Further, it may be a shape or surface model which is fitted to the respective 3D medical images.

The invention is particularly useful for viewing and analysing a particular anatomical feature of interest, which is usually a part of the anatomical structure. Such feature of interest is contained in a smaller volume of interest (VOI) than the complete field of view of the 3D medical images. It may be a part of the organ constituting the anatomical structure, in particular a part having a complex anatomy, such as a heart valve. In useful embodiments, the anatomical feature of interest is the mitral valve, the tricuspid valve, the aortic valve or the pulmonary valve. In other embodiments, the anatomical feature of interest may be other important blood vessels such as the coronary blood vessel, or another structure such as a tumour.

In order for such anatomical feature of interest to be viewed in greater detail, the invention provides for a volume rendered volume of interest (VOI), which contains said anatomical feature, but preferably not much more than the anatomical feature of interest, i.e. the VOI is as small as possible. In other words, the size and/or shape of the VOI is adapted to match the size and/or shape of the anatomical feature of interest as closely as possible, and this preferably over the whole sequence of images. Accordingly, a VOI containing the anatomical feature of interest is determined within each of the three-dimensional images, wherein the volume of interest follows the position and/or the shape of the anatomical feature of interest across the time period. A VOI is a sub-volume from a 3D image and is for example defined by a set of closed surfaces which enclose a volume belonging to said VOI. The VOI contains voxels with different grey values. When volume rendering the VOI, one or several settings/parameters, like the threshold, determine which voxels within the VOI are displayed and how. The VOI according to the invention may be cuboid, cylinder shaped, spheroid or having an irregular shape. The volume of interest is usually defined based on the position and/or shape of the anatomical feature of interest and may have a fixed size across the sequence of images, for example a box or cylinder having a pre-determined edge length and diameter. Said pre-determined length and diameter is preferably chosen so that the size of the VOI corresponds to the expected size of the anatomical feature of interest. In some embodiments, the size may vary across the time period, depending on the size of the anatomical feature of interest on each 3D image. The purpose of the VOI is to define a volume on each 3D image in which the feature of interest is contained. Thus, by volume rendering only the image content within such VOI, one may obtain a very good visualisation of the feature of interest, without the view being obstructed by other volume rendered parts of the anatomical structure, which are of less interest.

In useful embodiments, the dynamic model covers or abuts the anatomical feature of interest, i.e. it is spatially related thereto, such as the left ventricle is in spatial relation with the mitral valve. The anatomical feature may also be part of the dynamic model. Thus, each volume-rendered VOI is based on a corresponding 3D medical image, and for example the centre of the VOI of each volume rendering of the sequence is at a fixed relative position with respect to the position of the anatomical feature of the dynamic model at a corresponding point in time within the time period.

The step of determining the VOI may be performed as part of providing the dynamic model. In the case of a mitral valve, for example, a dynamic surface model of the left ventricle will include a set of (landmark) points on the mitral annulus. The mitral annulus constitutes the anatomical junction between the ventricle and the left atrium, and serves as insertion site for the leaflet tissue. Accordingly, the dynamic model will include a definition of the position of the mitral valve, which may be used to define the VOI for every 3D image in the sequence. In other embodiments, the position of the anatomical feature of interest may be defined by segmentation techniques and feature/speckle tracking techniques, wherein a certain landmark point is identified on one image, and then tracked over the entire sequence of images. The position may be defined by a single point in the three-dimensional image space, but may also be defined by a set of points, or the position of a geometric structure, or even of a volume.

In order to allow a user to view and analyse the anatomical feature of interest, a three-dimensional visualisation environment is provided for visualising the dynamic anatomical structure across the time period. A visualisation corresponding to a particular point in time within the time period comprises at least two different kinds of visualisation/depictions. These are in the same coordinate system, i.e. they are displayed in the correct relative spatial positions and orientations with regard to one another. In the event that the two different visualisations overlap spatially, they may be overlaid or superposed with one another, e.g. both are depicted transparent, or one may be considered more important than the other and may overwrite the other. The at least two visualised objects are:

(i) A volume rendering of the VOI, i.e. the image content of the three-dimensional medical images within the VOI is volume-rendered and displayed. Since the VOI follows the position and/or the shape of the anatomical feature of interest, this volume rendering should be a volume rendering essentially of the anatomical feature of interest (and possible the immediate surroundings, but not much more). Thereby, the user is given a detailed and unobstructed view of the particular anatomical feature of interest, without losing the benefits of volume rendering, since volume rendering is applied only where it counts. In useful embodiments, the selected settings for the volume rendering, such as a threshold, smoothing etc., is adjustable, either automatically and/or by a user.

(ii) Secondly, a visualisation of the dynamic model is depicted, in particular a three-dimensional visualisation of the dynamic model at the same point in time as the three-dimensional image from which the VOI is volume-rendered. Thereby, the user is given further orientation and navigation information. For example when analysing the mitral valve in the VOI, he can at the same time keep track of the left ventricular outflow tract (LVOT). This is important when planning interventional procedures such as valve replacement, e.g. transcatheter aortic valve implantation (TAVI) or transcatheter aortic valve replacement (TAVR), or a replacement of the mitral valve, in which the LVOT may not be obstructed.

Such visualisation may be displayed in cine mode, also called cinematic or movie mode. In cine mode, the user is shown a sequence of visualisations corresponding to the sequence of 3D medical images, preferably in a suitable frame rate in the order of 5-100, preferably 20-60 frames per second, so as to give the user a good impression of the moving dynamic model, together with the moving feature of interest. In a useful application, for example the beating heart and the respective valve opening and closing is visualised, wherein the time period is at least one heartbeat.

Thereby, the movement of the volume-rendered VOI (e.g. the part of the heart valve and the LVOT) is locked to a moving structure of the surface model (e.g. the mitral annulus) and therefore moves dynamically over the entire cardiac cycle. Accordingly, the invention prevents the relevant part of the anatomy (feature of interest) from moving out of the VOI and ensures that the current situation can be analysed, measured and interpreted faster and with more confidence. The inventive visualisation environment may be used to view and analyse complex dynamic anatomical structures, in particular for planning interventions and/or determining the correct size, shape and position of implant to be implanted in future interventions.

The 3D visualisation of the dynamic model is typically a rendering of a dynamic shape or surface model, wherein the rendering may be done by techniques available from computer graphics, including shading, ray casting, ambient occlusion etc.

The volume rendering may be performed by any volume rendering technique known in the art, for example as described in US 2005/0253841 A1, incorporated herein by reference. Usually, one needs to define a camera position and a viewing direction in space to perform volume rendering. Also, some techniques define the opacity and colour of every voxel. In some volume rendering techniques, a volume may be viewed by extracting isosurfaces (surfaces of equal grey scale values) from the volume and rendering them, e.g., as polygonal meshes or by rendering the volume directly as a block of data. The marching cubes algorithm is a common technique for extracting an isosurface from volume data. Another common technique is volume ray casting. In this technique, a ray is generated for each desired image pixel. Using a simple camera model, the ray starts at the centre of protection of the camera (usually the viewing position or eye point) and passes through the image pixel on an imaginary image plane floating between the camera and the volume to be rendered. Then the ray is sampled at regular or adapted intervals throughout the volume. The data is interpolated at each sample point, a transfer function applied to form an RGBA sample, the result added onto the accumulated RGBA of the ray, and the process repeated until the ray exits the volume. The process is repeated for every pixel on the screen to form the completed image.

According to a particularly useful embodiment, the three-dimensional visualisation environment is a virtual reality environment. By "virtual reality", any computer-generated visualisation providing a truly three-dimensional experience of the depicted structure is meant. Accordingly, the virtual reality (VR) environment of the invention provides in particular visual feedback, but may also allow other types of sensory feedback, such as auditory. The VR environment may also be an augmented reality environment, wherein the user stills sees the real environment, but with the VR objects (e.g. the volume rendering and the dynamic model) overlaid or superimposed on the reality objects, or a mixed reality, in which real-world objects are superimposed on a virtual scene. Together, the volume-rendered VOI and the visualisation of the dynamic model may form a visualised object, preferably a virtual reality object.

The virtual reality environment is generally realised by presenting stereo images to the user, i.e. each eye sees a different image, so that the brain will put together the two different images to a true three-dimensional scene. Such binocular images may be presented on any VR display, such as a virtual reality headset or a multi-projected environment, or a screen showing the two images intermittently, in connection with shutter glasses.

In the VR environment, the volume rendered VOI and the dynamic model may be displayed by stereoscopic rendering: Therein, the volume rendered (or otherwise rendered) visualisation/image is calculated twice, for two viewing positions having a slight spatial offset, i.e. one viewing position for the left eye and one for the right eye. When the two thus calculated visualisations are shown to the user one on each eye, e.g. on a VR headset, the user gains a truly three-dimensional (VR) impression. Thereby, the volume rendered VOI and the dynamic surface model can be converted into VR.

In a preferred embodiment, a person using an inventive VR environment is able to "look around" the artificial world, move around in it, and interact with virtual objects, features or items. The effect is commonly created by VR headsets comprising a head-mounted display with a small screen in front of each eye, but can also be created through specially designed rooms with multiple large screens. In order for the user to move around in the VR environment, position and orientation information have to be transmitted by the headset to the electronic device (e.g. computer) generating the VR environment, so that the visualisation is moving in coherence with head movements of the user. In order for the user to interact with virtual features in the VR environment, also hand movements must be tracked, which may be done by hand-held VR controllers. However, this last feature is optional, as well as the transmission of position/orientation information in order for the user to walk around in the virtual scene.

In useful embodiments, the user is able to zoom/scale the visualisations/models in the VR environment, adjust visualisation parameters and rendering settings, and/or grab the displayed objects, in particular the volume-rendered VOI and/or the visualisation of the dynamic model. Since they are locked with one another, they are preferably grabbed and moved together. Further, in useful embodiments the VR environment comprises a lamp which the user may grab and move in the VR environment, so as to influence the lighting of the volume-rendered VOI and the surface. In useful embodiments, also the brightness of the scene, in particular the brightness of a movable lamp, may be adjusted. A further useful embodiment uses a VR environment in which several users may be together in one scene.

The virtual reality environment provides the advantage that the user may view and analyse the visualised object with great confidence, since he obtains a truly three-dimensional view of the anatomical structure. Further, since he can walk around it and possibly even into it, he can have the visualised object (e.g. the visualisation of the human heart) displayed in huge magnification, so as to completely fill the space in front of the user. Therefore, the user has a particularly good overview and may take measurements with great accuracy. Further, the handling of user input events is particularly easy and intuitive in a VR environment. Actions such as turning and/or adjusting the settings of the volume-rendered VOI, which may be quite tricky on a two-dimensional screen, are very intuitive and fast in a VR environment using VR controllers.

However, the invention may also be advantageously used with non-VR visualisation environments. Where VR (virtual reality) is not specifically mentioned, the following features and embodiments are useful for both VR and non-VR visualisation environments.

In a useful embodiment, the dynamic anatomical structure is a human or animal heart and the anatomical feature of interest is a part of the heart, such as a heart valve or a coronary blood vessel. It is particularly useful if the sequence of 3D images has been acquired by ultrasound, such as TEE, since this technique provides dynamic images at a high framerate, is cheap compared to other image modalities like CT or MM, and has a minimal risk and radiation exposure for the patient. In a further useful application, the dynamic model is a dynamic surface model of one or several heart chambers, and the anatomical feature is a heart valve. In a useful embodiment, the dynamic surface model is a model of the endocardium of the left ventricle and (part of) the left atrium, and the feature of interest is the mitral valve.

The invention may find particular use in planning minimally invasive heart surgery, such as surgery on a heart valve or a heart valve replacement. New minimally invasive methods like transcatheter valve replacement can be used for patients who were formerly considered inoperable and/or not suited for open-heart surgery. Some transcatheter valve replacements (e.g. TAVR) use a fully collapsible bioprosthetic valve. However, it is crucial for the success of these interventions that the existing pathology/geometry is analysed and understood completely and that the new valve is carefully selected, sized and positioned to ensure that it is working properly and not obstructing the LVOT or coronary arteries. This is particularly true for valve-in-valve (ViV) interventions. Thereby, a dysfunctional valve—sometimes a bioprosthetic mitral valve—is replaced by a new valve in a minimally invasive ViV procedure. Thereby, the replacement valve is positioned inside the old valve, destroying the old valve while it unfolds. Therefore, it is crucial that the valve should be positioned correctly and have the correct size. In particular, it is important that the new mitral valve does not obstruct the left ventricular outflow tract (LVOT). Therefore, for valve in valve intervention planning, the volume-rendered VOI contains the mitral valve and preferably also the LVOT. The left ventricle is represented by a dynamic surface model, and includes a definition of a set of landmark points on the mitral annulus. These points may be used as the basis for defining the VOI, which accordingly moves with the heartbeat, thereby preventing the mitral valve from moving out of the volume of interest. In a useful embodiment, the user may measure e.g. the diameter of the mitral valve and accordingly select the best fitting valve from a library.

Accordingly, when the anatomical feature is a heart valve, the invention allows an excellent visualisation of the valve in the surface rendered VOL The rest of the heart chamber, for example the left or right ventricle and/or atrium, is represented only by the simplified surface model, which is dynamically pumping with the heartbeat, but not obstructing the view on the anatomy of interest, the valve.

In a useful embodiment, the dynamic model is a dynamic surface model and is derived from the sequence of three-dimensional medical images by image segmentation over the three-dimensional images, or by image segmentation in one three-dimensional image and speckle or feature tracking in the subsequent images. Image segmentation is the process of partitioning a digital image into multiple segments or sets of pixels/voxels, and is typically used to locate boundaries. Thus, segmentation is the process of assigning a label to every voxel in a 3D image such that voxels with the same label share certain characteristics. Image segmentation may be performed using thresholding, i.e. all voxels above or below a certain threshold are assigned the same label. Other methods include clustering methods, edge detection or region-growing methods. In the case of the heart, segmentation may serve to separate the blood-filled cavities, in particular the ventricles and atriums, from the heart tissue such as the heart walls and the valves. When a boundary between e.g. a blood-filled cavity and the tissue of the heart wall is detected, a surface model may be built by e.g. selecting a number of voxels on the boundary and connecting them to a wire-mesh model or triangulated surface model. This process may be performed for each 3D image in the sequence. According to another useful method, only one image in the sequence is segmented, e.g. as described above, to extract e.g. a static surface model. The dynamic model is then derived from this static model by feature tracking. Thereby, certain characteristic features of the anatomical structure are selected in one 3D image of the sequence. Such characteristic features are then tracked from image to image over the sequence, which is preferably done automatically using feature tracking algorithms. In the case of ultrasound images, preferably 3D speckle tracking is used. This is a feature tracking method using the characteristic speckle artefacts of M-mode ultrasound images for tracking, since the speckle is due to interference effects between overlapping echoes and its occurrence is thus related to the respective anatomy. Therefore, the 3D ultrasound speckle may be tracked like any anatomical feature from image to image, and may thereby be used to derive a dynamic model of anatomical structures. In a particularly useful embodiment, speckle tracking is used to derive a dynamic surface model of the left ventricle. Such surface model includes the mitral annulus, and the mitral annulus in turn is used to define and lock the VOI containing the anatomical feature of interest, namely the mitral valve.

According to a useful embodiment, a position and/or orientation of the volume of interest is determined across the time period by identifying a corresponding position and/or orientation of the feature of interest in the dynamic model. Accordingly, when the feature of interest is part of the structure, which is modelled by the dynamic model, tracking the position and/or orientation of the VOI over the sequence of images is simplified by using the dynamic model, for example by using certain landmark points which are part of the model.

More generally, according to a useful embodiment, the volume of interest may be defined by identifying a set of landmark points of the anatomical feature, by defining an approximation surface spanning the set of landmark points, and by defining a volume extending above and/or below and/or to the side of the approximation surface. Thereby, the volume of interest is locked to the anatomical feature, and if the anatomical feature is part the structure which is modelled by the dynamic surface model, the VOI will move together with the dynamic model and in particular with the anatomical feature of interest. The set of landmark points may for example be several points on a characteristic surface or boundary, for example the endocardium or epicardium. According to a preferred embodiment, the set of landmark points are points on the mitral annulus, or the annulus of another heart valve. The set of landmark points may also be termed point cloud. The approximation surface is preferably a surface, which may have a predetermined shape, such as spherical, spheroid, ellipsoid or oval, and which is fitted to the point cloud by a fitting technique, so as to obtain the best fit (e.g. least squares) to the point cloud. The surface may advantageously be planar for efficient handling, but it might also be non-planar so as to best fit the set of landmark points. The thus defined approximation surface is then used to determine the VOI by defining a volume encompassing the approximation surface and extending, preferably by a pre-determined length, above and/or below and/or to the side of the approximation surface. In a useful embodiment, the VOI extends up to a pre-determined length which is characteristic for the feature of interest, e.g. 1 cm for a mitral valve, above and below the approximation surface, and a security width of e.g. 1 cm to the side, to ensure that the feature of interest is completely contained in the VOL By using a predetermined length/width, the processor or computer controlling the visualisation may automatically define the VOI from a set of landmark points on the feature of interest, for each 3D image of the sequence. When the feature of interest is the mitral valve, the approximation surface will be an approximate circle in the plane of the mitral valve. Thus, by defining a volume extending above and below said approximation surface, by a predetermined length, and possibly extending towards the side by a predetermined width, a VOI may be selected which contains the mitral valve and possibly the LVOT in addition, but wherein no further hindering anatomical structures are contained. Thereby, the volume rendering furnishes an unobstructed and accurate view of the anatomical feature of interest, e.g. the mitral valve.

According to a useful embodiment, an input tool is provided together with the three-dimensional visualisation environment.

In a non-VR visualisation environment, the input tool may be a keyboard, a pointing device such as a mouse, trackball, touchpad or touch-sensitive display, which are usually used in conjunction with an interactive panel comprising buttons, sliders etc. viewed on a screen. Such buttons or sliders may for example be actuated by the user with his finger or a pointing device, e.g. the user may move a cursor on a screen to actuate the input tools. By such input tools, the user may for example zoom in and out of the visualisation, adapt visualisation parameters/settings such as a volume rendering threshold, smoothing, lighting and contrast, start and hold the cine mode, and perform measurements on the volume rendered VOL In a particularly useful embodiment, the input tool allows a user to select points and to take measurements on the anatomical structure. For example, the user may selects two points on the volume rendering, and the distance between such points will automatically be calculated. This feature is useful when planning interventions, e.g. choosing implants. In some embodiments, the user may be able to "grab" the visualised object by means of a pointing device, i.e. a mouse or a touch on the touch-sensitive display, and thereby move or tilt it.

In a VR environment, such input tool is preferably realised by a virtual controller allowing a user at least to grab and move an object within the virtual reality environment by hand gestures. Further, the VR controller may include buttons or sliders by which the user may take selections. In a VR environment, a user wearing a VR headset and holding at least one VR controller in one hand (preferably a VR controller in each hand) sees in the VR environment a static or dynamic visualisation of the anatomical structure consisting of the volume-rendered VOI and the dynamic model. Preferably, he can also see the controllers at the positions and orientations corresponding to the current hand positions and orientations. Thus, the VR environment provides the possibility for the user to move the controllers towards the visualisation, grab it by pressing a particular button, and move, turn or tilt the visualised object with the movement of his hands, like he would a real-world object. Thereby, the users have 18 degrees of freedom (six degrees of freedom, namely three rotational and three translational degrees of freedom for each of the VR headset and the two VR controllers) to correctly and intuitively view and analyse the visualised object. This closely resembles the natural way of interacting with objects.

According to a useful embodiment, the input tool as described above allows a user to select a plane in the visualised three-dimensional volume. The method then preferably comprises a step of displaying a multi planar reconstruction (MPR) of the selected plane of at least one of the three-dimensional medical images of the sequence, in particular at the position in the three-dimensional visualisation environment corresponding to the selected plane. A multi planar reconstruction is an image reconstructed from several original image planes. In CT for example, a stack of usually transverse images is acquired. Thus, if a sectional plane intersecting the stack of images at a different orientation than transverse is to be viewed, the user may select the desired orientation, and an MPR is created by e.g. interpolating from the respective nearest pixels in the various transverse slices. Displaying an MPR in addition to the volume rendered VOI and the dynamic model allows the user to view the anatomical structure in more detail. In the virtual reality environment, thanks to the 18 degrees of freedom (VR headset and two controllers), the correct positioning of a grippable MPR plane in the 3D volume is very fast and verifiable, and measurements on the MPR plane or within the volume-rendered part become more precise and reliable.

According to a useful embodiment, a VR controller allows a user to adjust parameters by means of gesture control. For example, the user selects a certain parameter by touching it using hand movement in the VR environment. He may then use gestures to e.g. actuate a virtual slider, or simply move the controller horizontally (or vertically) to adjust the parameter without reference to any slider. Suitable parameters are related to the visualisation and may be selected from a volume rendering threshold, smoothing, lighting intensity, size, opacity of a visualised object, starting and holding the cine mode etc.

In a useful embodiment, the three-dimensional visualisation environment also comprises displaying a computer graphical object corresponding to a medical device, in particular to an implant, in the same coordinate system as the volume rendering and the dynamic model. A computer graphical object is for example a three-dimensional representation of geometric data, e.g. a 3D structure defined by vertices, such as a polyhedron. The computer graphical object is preferably locked to the movement of the anatomical structure, i.e. it is once placed in a particular position and orientation with regard to the volume-rendered VOI in any one frame. When the user starts the cine mode, the processor controlling the visualisation remembers the relative position and orientation of the computer graphical object with regard to the volume-rendered VOI and will keep this relative position and orientation. In the case that the computer graphical object represents a new valve, such new valve can be locked to the movement of the valve annulus, e.g. the mitral annulus. Preferably, this may be done using 3D speckle, as explained above. Thereby, important dynamic information over the entire heart cycle is delivered, and the valve may be optimally positioned, thereby avoiding or limiting any obstruction of an outflow. Locking the position of the computer graphical object to a position in the dynamic model can be done by assigning one or several of the set of landmark points to the computer graphical object, which then has a fixed relative position to such landmark points across the time period.

According to a further embodiment, there is provided an input tool to a user, the input tool allowing the user to move and tilt the computer graphical object in relation to the volume rendered VOI and/or the visualisation of the dynamic model. Thereby, the user can not only measure, but also "try out" a selected implant or implant size, for example a replacement valve, to see if it fits the anatomical feature, e.g. the mitral valve. For example, the user may select the best fitting valve from a library and place the valve—or rather the computer graphical object corresponding the valve—inside the visualised object for an initial inspection. In a particularly useful embodiment, the computer graphical object looks similar to what the medical device will look like on interventional X-ray images (fluoroscopy images), because minimally invasive interventions are almost always done under fluoroscopy control. Thus, the user may visualise a scene in three dimensions and yet gain an idea on what the implant will look like on the fluoroscopy image. The computer graphical object is preferably three-dimensional, it may be, e.g., a simplified model of an implant, for example in the form of a wire mesh or an object defined by a set of simple surfaces.

The computer graphical object may also be a measuring device such as a measuring tape or yardstick.

All embodiments described herein are applicable both for "conventional" visualisation environment that can be realised on computer screen, tablet computer or display, as well as in a VR environment. However, the VR environment is particularly advantageous because it provides a true 3D view and the most intuitive/fast user experience/handling as well as 6, 12 or 18 degrees of freedom in which the user can move with respect to the visualised object.

Preferably, the method according to the invention is executed by a processor which may be incorporated in any electronic device able to control a display, in particular a VR display such as a VR headset or projection display. Such digital device may be a computer, PC, server, television set, tablet computer, smartphone, laptop, hand-held device or the like. The processor may also be part of a cloud computer, workstation, or the control console of a medical image device, in particular an ultrasound scanner.

According to another aspect, the invention provides a computer program comprising program code instructions which, when executed by a processor, induce the processor the carry out the inventive method. The computer program may be in any code, in particular a code suited for computer graphic applications, in particular for VR programming.

In a further aspect, the invention is directed to a computer-readable medium comprising an above-defined computer program. The computer-readable medium may be any digital data storage device, such as a USB-stick, hard disk, CR-ROM, SD card or SSD card. Naturally, the computer program need not be stored on such a computer-readable medium to be supplied the customers, but may be downloadable via the internet.

According to a further aspect, the invention is directed to a user interface configured to visualise a dynamic anatomical structure. The dynamic anatomical structure has been captured on a sequence of 3D medical images spanning a time period, each 3D medical image of the sequence showing the dynamic anatomical structure at a point in time during the time period. The user interface comprises:
 a) a three-dimensional visualisation environment configured to provide a three-dimensional visualisation of the dynamic anatomical structure across the time period, and a processor configured for generating a visualisation corresponding to a particular point in time within the time period, the visualisation comprising:
  (i) a display of a volume rendering of a volume of interest within the three-dimensional image corresponding to the particular point in time, the volume of interest containing an anatomical feature of interest; and
  (ii) a display of a dynamic model of at least a part of the dynamic anatomical structure at the particular point in time and in the same coordinate system as the volume rendering of the volume of interest,
 wherein the volume of interest follows the position and/or the shape of the anatomical feature of interest across the time period, when the dynamic model and the volume rendered VOI are displayed in cine mode, and wherein the volume of interest is smaller than the complete field of view of the three-dimensional medical images.

Any features or useful embodiments described in connection with the inventive method also apply to the user interface.

A user interface is for example a system comprising at least a screen or display (VR or non-VR display) and usually an input tool—as described above—allowing a user to interact with the content of the display, e.g. by adjusting visualisation parameters/settings, zooming, annotating and/or moving or tilting displayed objects.

In a preferred embodiment, the three-dimensional visualisation environment is a virtual reality environment and the display of the volume rendering and the dynamic model is a virtual reality display, in particular on a virtual reality headset.

In advantageous embodiments, the virtual reality environment comprises at least one input tool, wherein the input tool is a virtual reality controller allowing a user to perform one or more of the following actions:
 to grab and move an object displayed in the virtual reality environment;
 to take measurements on the anatomical structure;
 to adjust parameters used in the visualisation by means of gesture control; and
 to make annotations to the anatomical structure, wherein the annotations are locked to a position in the dynamic model when the dynamic model and the volume rendered VOI are displayed in cine-mode.

The virtual reality environment may be realized using commercially available VR equipment, such as the HTC VIVE or VIVE Pro Virtual Reality System, which includes a VR headset, two VR controllers, two position trackers and optionally a loudspeaker system (made by HTC Corporation, Taoyuan City 330, Taiwan).

SHORT DESCRIPTION OF THE FIGURES

Useful embodiments of the invention shall now be described with reference to the attached figures. Similar elements or features are designated with the same reference signs in the figures. In the figures.

DESCRIPTION OF EMBODIMENTS

Figure 1:
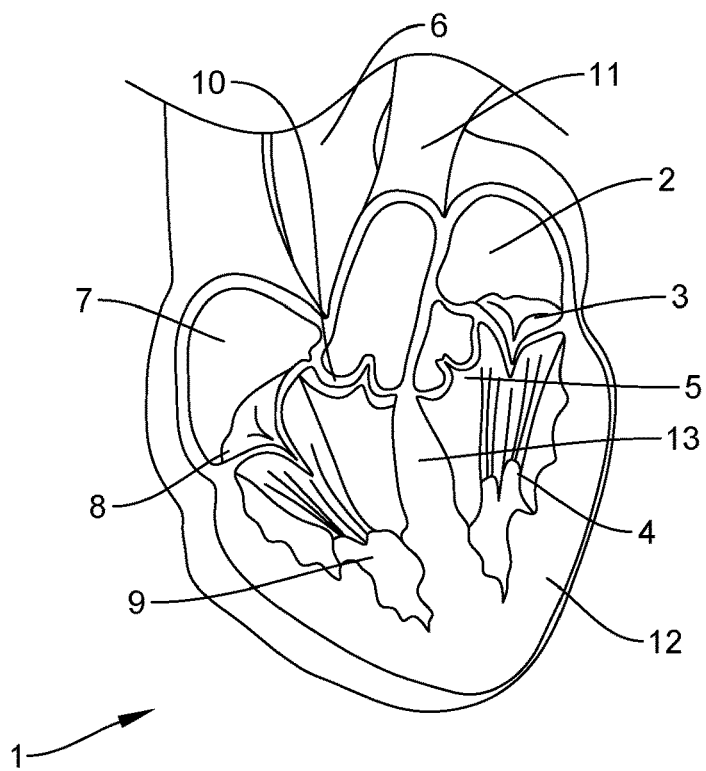
FIG. 1 shows a schematic cross-section through a human heart (4-chamber view)

In order to better visualise the preferred application of inventive visualisation method and user interface, FIG. 1 illustrates the structure of the human heart 1. The blood coming from the lungs flows into the left atrium 2 and from there through the mitral valve 3 into the left ventricle 4. From there, it is pumped through the aortic valve 5 into the aorta 6. This part is also termed left ventricular outflow tract (LVOT). The blood coming from the body flows into the right atrium 7 and is pumped through the tricuspid valve 8 into the right ventricle 9. From there, it is pumped through the pulmonary valve 10 into the pulmonary artery 11. Heart wall 12 is made of muscular tissue surrounding the heart chambers 2, 4, 7 and 9. The left and right ventricles are separated by the septum 13. It is evident from FIG. 1 that the heart has a complex shape, and in addition is constantly moving with the heartbeat, i.e. it is a dynamic anatomical structure. Thus, a visualisation of shapes such as the mitral valve 3 in order to plan a valve replacement is difficult and prone to errors.

Figure 2:
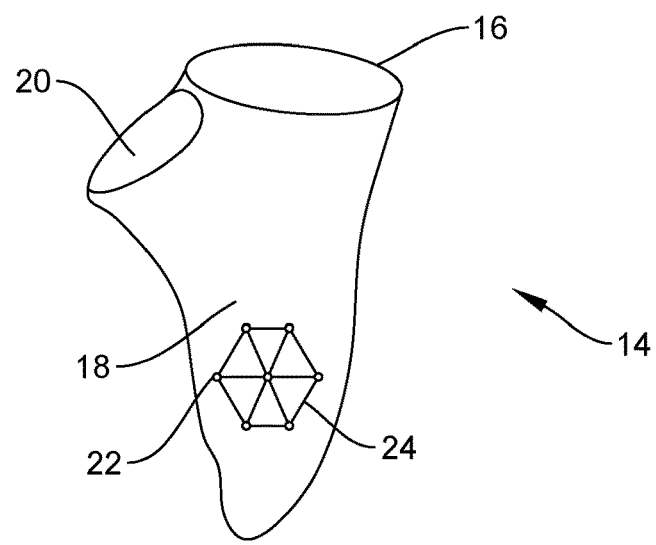
FIG. 2 shows a dynamic surface model of the left ventricle.

For a better visualisation of left ventricular activity, a dynamic surface model 14, represented in FIG. 2, may be used. This surface model 14 represents a simplified model of the blood-tissue boundary of the left ventricle 4. It essentially has the shape of a bag 18 with two openings 16, 20 at the top: The opening 16 represents the mitral annulus, whereas the opening 20 represents the left ventricular outflow track (LVOT), in which the aortic valve is located. The dynamic surface model 14 may be derived from a sequence of three-dimensional ultrasound images of the heart, in particular by tracking anatomical features or by tracking speckle from one image to the next. Thereby, a surface model consisting of a set of vertices 22 spanning a wire mesh 24 may be generated for each three-dimensional image. Such dynamic surface model 14 may be viewed in cine mode, i.e. like a movie, so that the viewer gains an impression of the movement of the left ventricle with heartbeat. Evidently, similar dynamic surface models may be formed of other parts of the human anatomy, in particular other heart chambers or blood vessels.

Figure 3:
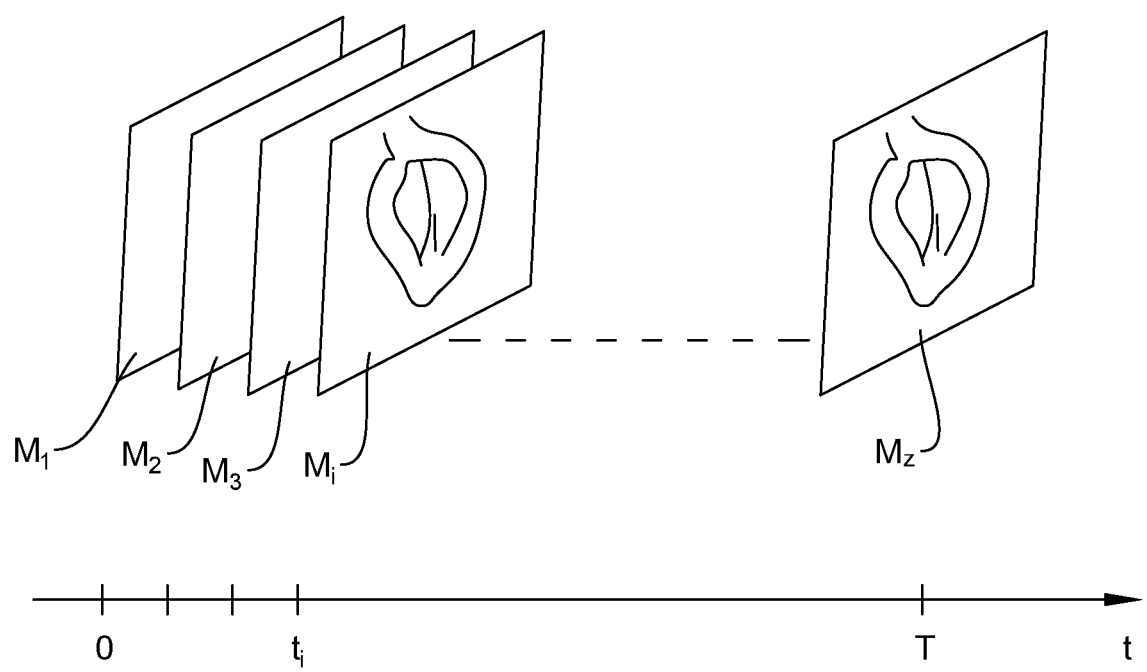
FIG. 3 shows a schematic representation of a sequence of medical images.

FIG. 3 shows a schematic representation of a sequence of ultrasound images $M_1, M_2, M_3, \ldots M_Z$ of the heart. Z is the number of images acquired during one heart cycle, i.e. in time T, wherein T is about 0.5 to 1.5 seconds. The figure shows two-dimensional images, however, preferably a three-dimensional image are acquired at each point in time $t_i$. A three-dimensional medical image may be formed by a stack of two-dimensional images. Such sequence of images $M_1, M_2, M_3, \ldots M_Z$ may be acquired for example by echocardiography of the moving heart, for example with a TEE probe.

Figure 4:
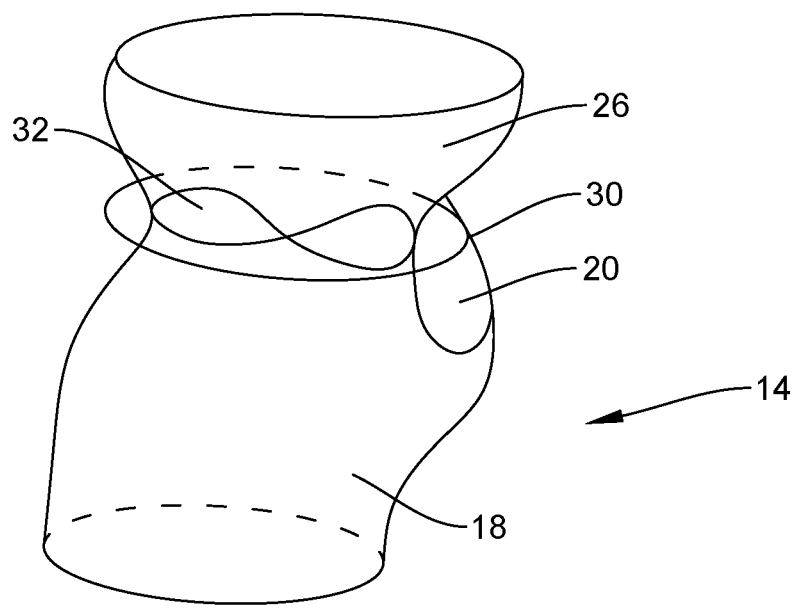
FIG. 4 shows a schematic view of a dynamic surface model including a reference position for the volume-rendered volume of interest.

According to an embodiment of the invention, a VOI containing an anatomical feature of interest is defined on the three-dimensional images across the time period. As shown in FIG. 4, such VOI may be determined by means of a set of landmark points or reference position 30 on the dynamic surface model 14. In the case where the feature of interest is the mitral annulus, a suitable reference is a model of the mitral annulus 30. In FIG. 4, this is represented by a ring-shaped object 30. The mitral annulus 30 is in between the surface model of the left atrium 26 and of the left ventricle 18. The LVOT 20 is also visible in FIG. 4, as well as the leaflets 32 of the mitral valve. Accordingly, the plane of the mitral annulus 30 may form the reference position for the volume-rendered VOI, which accordingly moves with the surface model 14 over the heart cycle.

Figure 5:
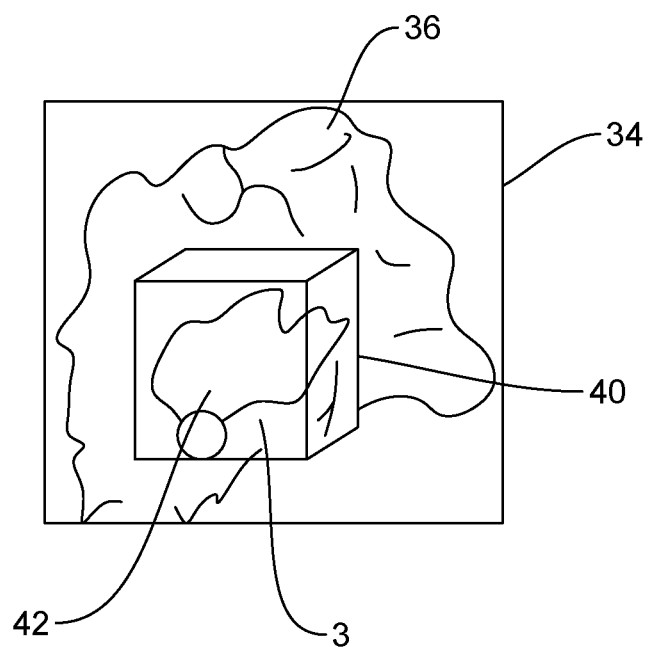
FIG. 5 shows a schematic representation of a volume rendering of a three-dimensional ultrasound image of the heart, including volume of interest.

FIG. 5 illustrates a volume rendering 34 of a three-dimensional image, in this case a volume rendered heart 36. As is evident from FIG. 5, a volume rendering of a three-dimensional ultrasound image is generally hard to interpret, because it contains many anatomical details. Therefore, according to the invention, a volume of interest 40 is defined, and only the image content inside this VOI 40 is submitted to the volume rendering process. In this case, the VOI contains the mitral valve 3, wherein the opening of the valve is shown at 42. The VOI 40 may be box-shaped or cubic, as illustrated in FIG. 5. It may also have any other three-dimensional shape, it may have the shape of a sphere, ellipse, cylinder, etc. For the application where the anatomical feature of interest is the mitral valve, the VOI may have the shape of a box or a circular cylinder, or even an irregular shape extending a defined length above and below the plane of the mitral annulus. By defining the VOI in a fixed relative position with respect to the position of the anatomical feature, especially on the dynamic model at each point in time within the time period, the VOI is locked to the movement of the moving anatomical feature of interest (e.g. the mitral annulus) in the surface model throughout the entire time period, e.g. the cardiac cycle. Thereby, the feature of interest (e.g. the mitral valve 3) does not move out of the volume-rendered VOI 40.

Figure 6:
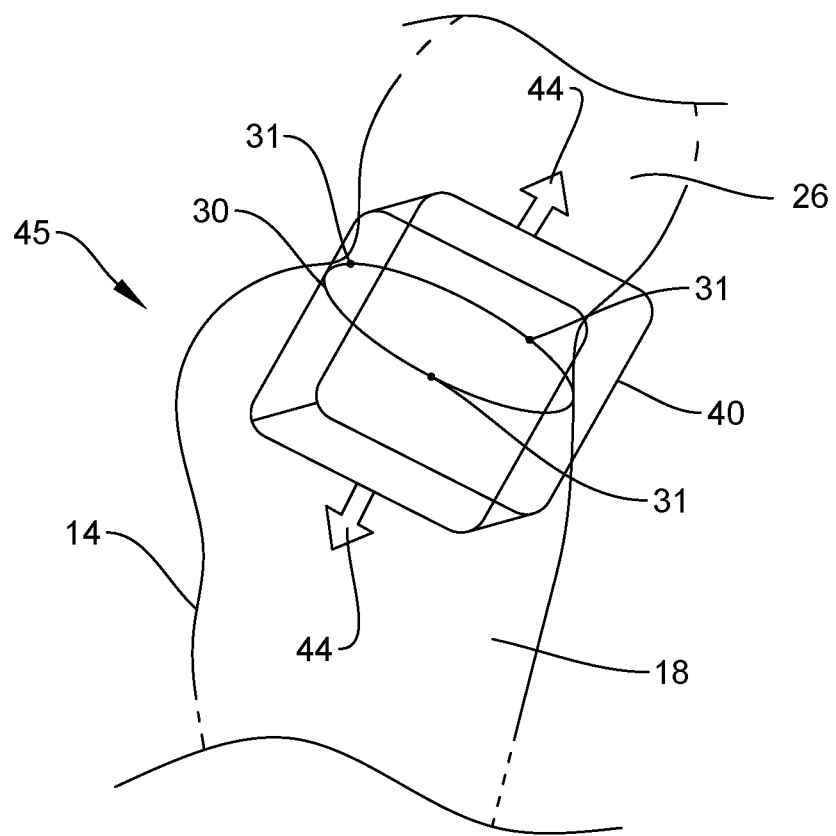
FIG. 6 shows a schematic representation of a dynamic model and a tracked volume of interest.

Accordingly, a visualisation 45 corresponding to a particular point in time furnished by the three-dimensional visualisation environment according to an embodiment of the invention may look as shown in FIG. 6: The visualisation 45 comprises a visualisation of the dynamic model 14, which includes a bag-shaped surface model of the left ventricle 18 and the left atrium 26. The mitral annulus 30 is for example determined on each of the three-dimensional images by segmentation on one 3D image, and by means of a feature tracking or speckle tracking method on the further images. Thereby, and a set of landmark points 31 is defined for the mitral annulus. A ring-shaped model 30 of the mitral annulus is fitted to the set of landmark points, and thereby defines an approximation surface, which is the plane spanned by the fitted ring 30, in this case the approximation surface is spherical or oval and planar. The VOI box 40 is defined with respect to the approximation surface 30 of the mitral annulus ring 30 on each of the three-dimensional images and thereby moves with the moving heart, as illustrated by arrows 44. Inside the box-shaped VOI, the three-dimensional images are volume-rendered, preferably with an adjustable threshold, and thus the volume rendering is locked to the mitral annulus when viewed in cine mode.

Figure 7:
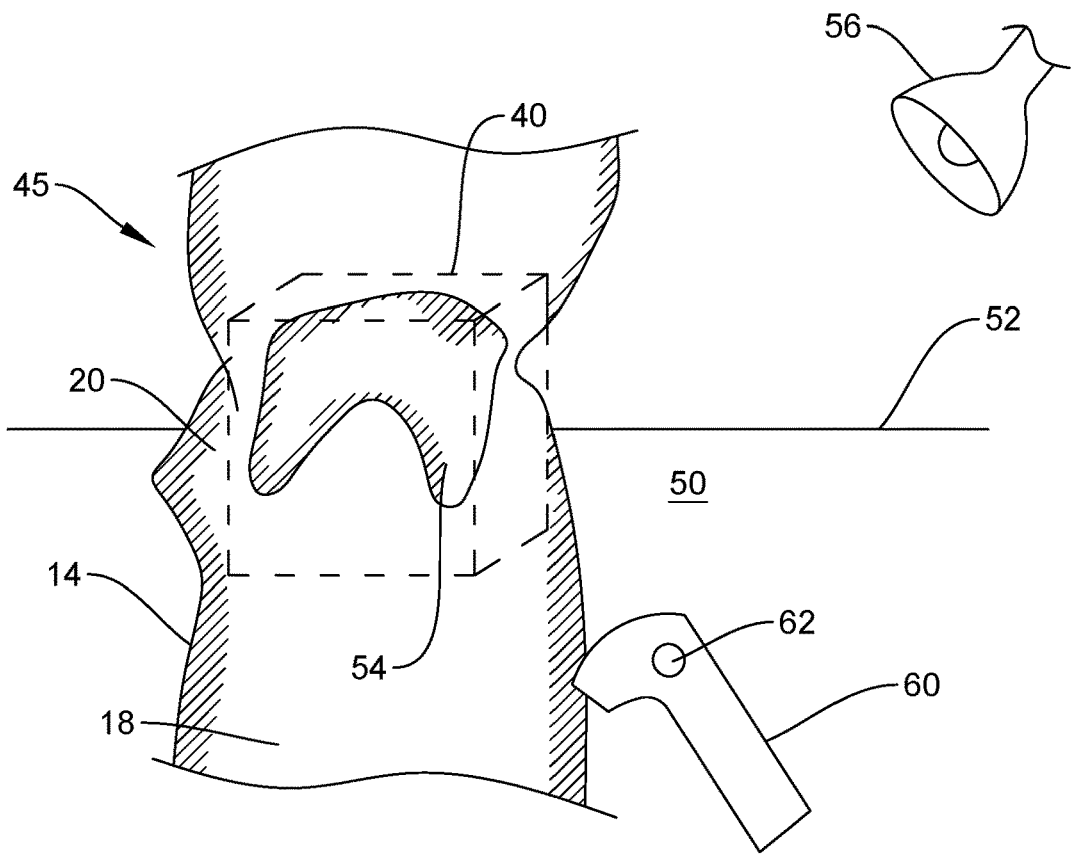
FIG. 7 shows a representation of a three-dimensional visualisation according to an embodiment of the invention.

This is further illustrated in FIG. 7, which shows a VR environment 50 according to an embodiment of the invention. When using such user interface, the user will find himself in a virtual reality environment, including for example a virtual horizon 52 and a virtual lamp 56. Alternatively, he may find himself in a closed room. The visualisation of the dynamic anatomical structure 45 will be floating in the free space in front of the user, thus he will see a three-dimensional visualisation of the dynamic surface model 14, which appears like a transparent vessel having the shape of the left ventricle and possibly the left atrium. At the position of the mitral valve, VOI 40 is locked to the movement of the heart. Since the user will not actually see the outlines of the VOI box 40, the box is indicated in dashed lines. What the user will see is a virtual reality object 54 and which corresponds to a volume or surface rendering of the image content inside the VOI box 40, namely a volume rendering 54 of the mitral valve 3. Both the surface model 14 and the volume rendering 54 will be moving with the heartbeat, wherein the user may start and stop the cine-mode at any point in time within the time period, wherein the time period spanned by the sequence is at least one heartbeat. In a useful embodiment, the user may actuate an input tool, namely a virtual reality controller 60. This may have buttons 62 which the user may press to start and stop the cine-mode, or to grab and move or tilt the visualisation or virtual reality object 45. The user will hold the VR controller 60 in his hand, and ideally would see the controller in front of him at a position corresponding to the real-life hand position.

Figure 8:
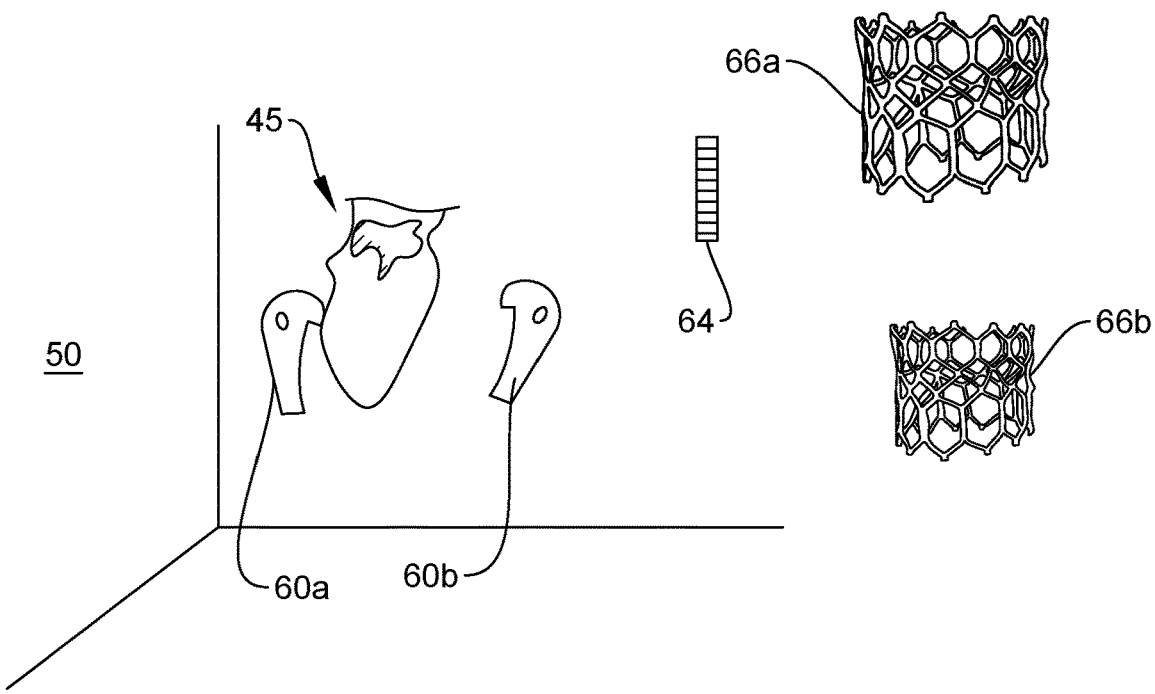
FIG. 8 shows a virtual reality environment according to an embodiment of the invention.

Further advantageous features of the VR environment 50 are illustrated in FIG. 8. In useful embodiments, the user not only sees the controller 60a and a virtual reality object 45 comprising the volume-rendered VOI and the dynamic surface model, but also further tools or VR objects. For example, a tool 64 may be a yardstick or ruler for measuring the dimensions of the anatomical structure, for example the mitral valve. Alternatively, VR controllers 60a, 60b held in either hand of the user may be utilised directly for performing measurements on the three-dimensional visualisation 45 by the user selecting points in VR space, wherein the processor calculates the distance in between. Based on such measurements, the best fitting valve may be selected from a library. Accordingly, VR environment 50 may contain VR-compatible computer graphical objects 66a, 66b representing implants, in this case mitral valve implants, which can be grabbed by the user with the controllers 60a, 60b and "tried on" the mitral valve represented in the visualisation 45. Thereby, the user can also try out the positions of the valves 66a, 66b, so that he will be able to insert the valve at the correct position during the actual intervention. Therefore, VR objects 66a, 66b are constituted by the elements of the valve implants which are visible in fluoroscopy images, in this case a wire structure. Such valve prosthesis may be used in valve-in-valve procedures and are unfolded directly into the old valve in a minimally invasive procedure.

Figure 9:
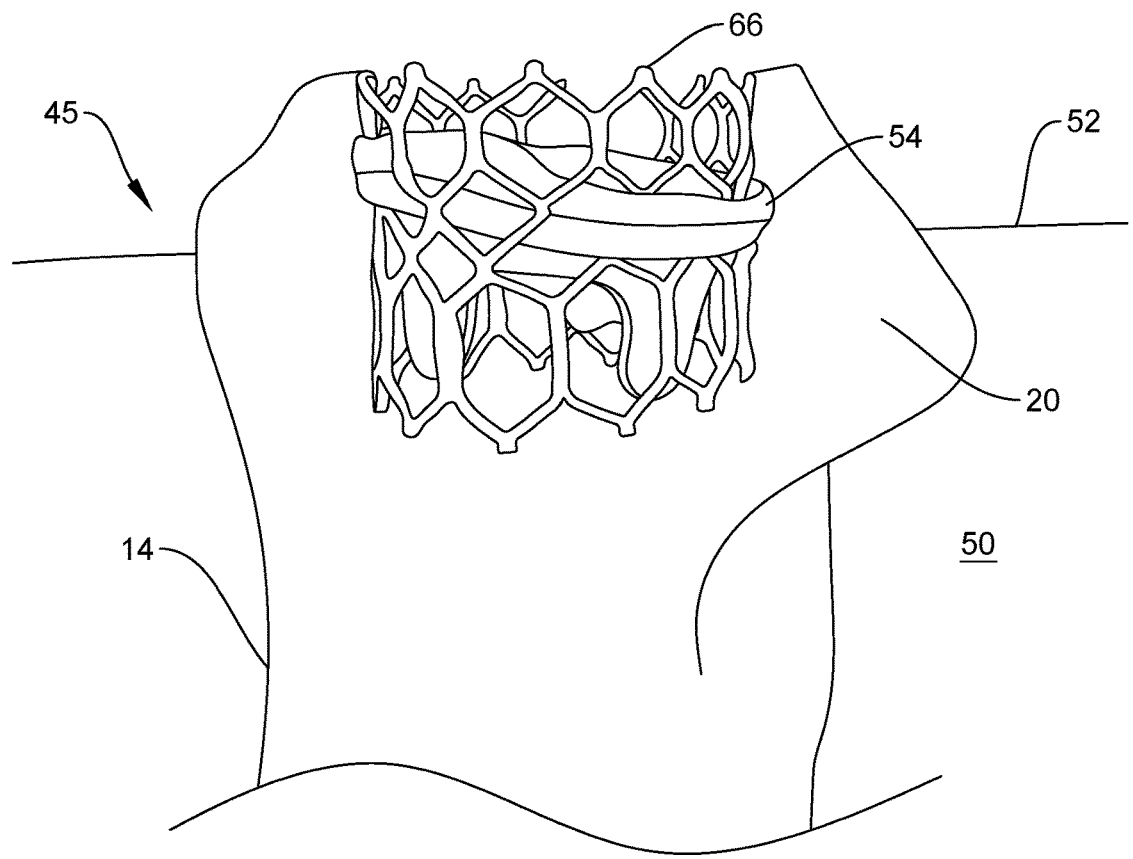
FIG. 9 shows a larger view of the three-dimensional visualisation according to an embodiment of the invention.

FIG. 9 illustrates an enlarged view of the VR environment 50, showing the horizon 52 and surface model 14 of the left ventricle. Volume-rendered valve 54 is also shown. In this visualisation 45, the user has selected and grabbed a new valve 66 (or rather a VR object corresponding thereto), has placed it inside the three-dimensional visualisation 45 for an initial inspection. The new valve is then locked to the movement of the mitral annulus using 3D speckle tracking. The remaining LVOT 20 and possible obstructions can be measured and evaluated throughout the cardiac cycle. Further, the placement of the VR object corresponding to the valve can be optimised in the dynamic movement. The placement of the valve can be adjusted while simulating the movement within the cardiac cycle.

Figure 10:
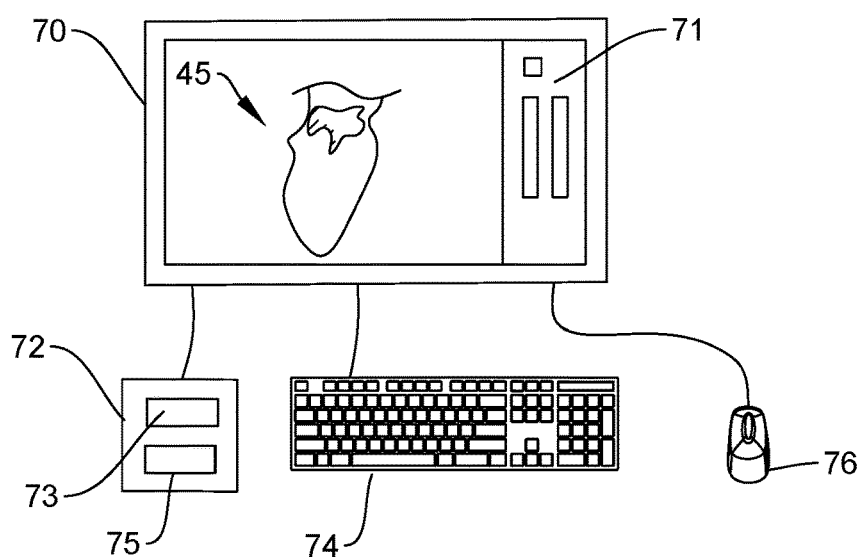
FIG. 10 shows a user interface according to a first embodiment of the invention.

FIG. 10 shows a user interface according to a non-VR embodiment of the invention. In this setting, the dynamic visualisation 45 is on a conventional computer screen 70, and the visualisation is merely a rendering on a two-dimensional screen 70. The screen may comprise a panel 71 of buttons and sliders allowing the user to tilt, zoom, move or otherwise manipulate visualisation 45. Also in such a user interface, it is useful tool to have a volume rendered VOI which is locked to the position of a feature of interest on a dynamic model of a dynamic anatomical structure, such as the beating heart. The display may be controlled by a computer 72, such as a PC, including a processor 73 and a hard disc 75. The user interface may have input tools such as a keyboard 74 and/or a mouse 76.

Figure 11:
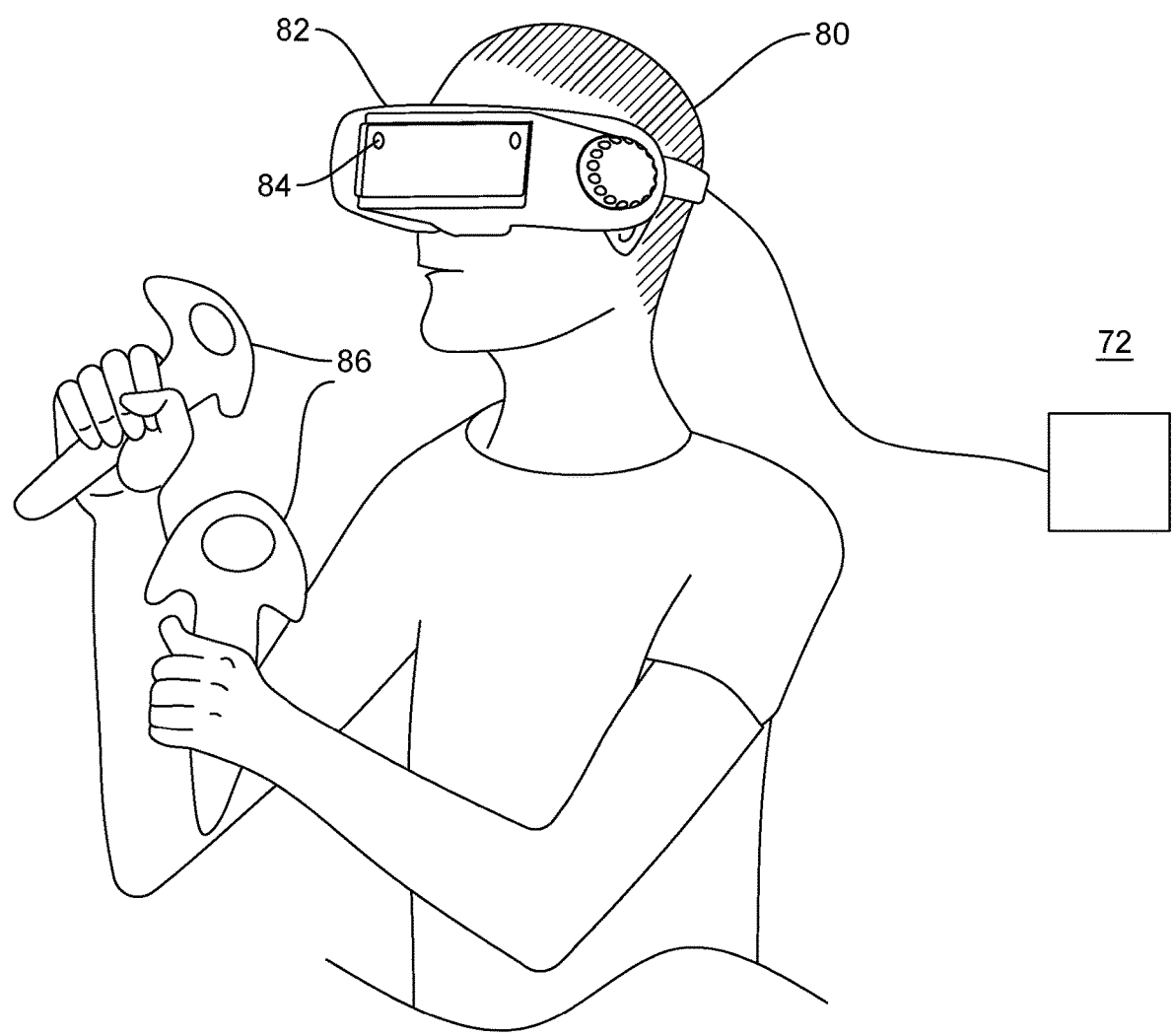
FIG. 11 shows a user interface according to a second embodiment of the invention.

However, in a preferred embodiment, the user interface is a virtual reality interface, as shown in FIG. 11. Such interface is realised by a virtual reality headset 82 worn by a user 80. The headset 82 is connected to a computer 72, either through a cable or through wireless connection. Such virtual reality headset 82 includes internal displays, separate for each eye, as well as position sensors 84 which track the movement of the head. Such headset may also include cameras, in case an augmented reality environment is to be presented. Further, the user 80 is holding VR controllers 86 in his hands, wherein the controllers 86 also include position sensors (not shown) as well as buttons or other input elements. Such virtual reality controller 86 allows a user to grab and move an object displayed in the virtual reality environment 50. The VR headset may for example be an HTC VIVE headset and corresponding VR controllers.

Figure 12:
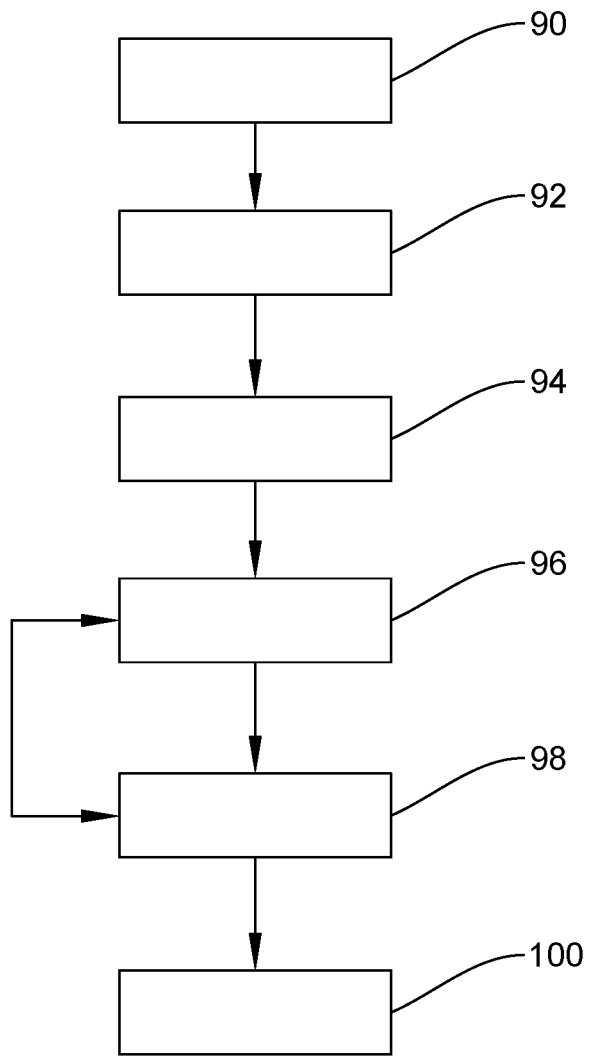
FIG. 12 shows a flow diagram illustrating the method according to an embodiment of the invention.

FIG. 12 shows a flow diagram illustrating the method according to an embodiment of the invention. In step 90, a sequence of three-dimensional medical images showing, e.g., the moving heart is provided, the sequence spanning a time period corresponding to one heartbeat. In step 92, a dynamic model of at least part the heart is provided, for example by fitting a surface model to a part of the anatomical structure, or by generating a surface model by segmentation of one image and feature/speckle tracking. Thereby, the dynamic model is automatically registered with the sequence of images, i.e. the model can be shown at the correct anatomical position on the 3D images. In step 94, the position of an anatomical feature of interest may be determined across the time period, and in particular by means of a reference structure such as the mitral annulus. Further, a volume of interest (VOI) containing the anatomical feature of interest is defined in step 94 within each of the three-dimensional images, so that the VOI follows the position and/or the shape of the anatomical feature of interest across the time period. In step 96, a three-dimensional visualisation environment is provided for visualizing the dynamic anatomical structure across the time period, as described above. Such visualisation environment may comprise an input tool in the form of a virtual reality controller, wherein input events from the user may occur in step 98. Such input events may then be used to change the visualisation environment shown in step 96, for example by changing the lighting or the threshold of a surface rendering. According to such input events 98, further objects may be shown in the visualisation environment in step 100, e.g. the representation of a valve implant.

While the invention has been illustrated and described in detail in the drawings and foregoing description, such illustration and description are to be considered illustrative or exemplary and not descriptive; the invention is not limited to the disclosed embodiments.

REFERENCE SIGNS

1 Heart
2 Left atrium
3 Mitral valve
4 Left ventricle
5 Aortic valve
6 Aorta
7 Right atrium
8 Tricuspid valve
9 Right ventricle
10 Pulmonary valve
11 Pulmonary artery
12 Hear wall
13 Septum
14 Dynamic surface model
18 Bag model of left ventricle
16 Mitral annulus
20 LVOT
22 Vertices defining model
24 Wire mesh
$M_1, M_2, M_3, \ldots M_Z$ Sequence of medical images
26 Model of left atrium
30 Approximation surface/model of mitral annulus
31 Landmark points
32 Leaflets of mitral valve
34 Volume Rendering
36 Heart
40 Volume rendered VOI
42 Valve opening
44 Arrow
45 Visualisation
50 VR environment
52 VR horizon
54 Volume Rendering as VR object
56 VR lamp
60, 60a, 60b VR controllers
62 Button
64 VR yardstick
66, 66a, 66b Computer graphical objects corresponding to valve implants
70 Screen
71 Input panel
72 Computer
73 Processor
74 Keyboard
75 Hard disc
76 Mouse
80 User
82 VR headset
84 Position sensor
86 VR controller
90-100 Method steps

The invention claimed is:

1. A method of visualising a dynamic anatomical structure, the method comprising:
   a) providing a sequence of three-dimensional medical images spanning a time period, each three-dimensional medical image of the sequence showing a dynamic anatomical structure at a point in time during the time period;
   b) providing a dynamic model of at least a part of the dynamic anatomical structure, wherein the dynamic model has been derived from and is registered with the sequence of three-dimensional medical images;
   c) determining a volume of interest containing an anatomical feature of interest within each of the three-dimensional medical images, wherein the volume of interest follows a position and/or a shape of the anatomical feature of interest across the time period, and wherein the volume of interest is smaller than a complete field of view of the three-dimensional medical images; and
   d) providing a three-dimensional visualisation environment for displaying the dynamic anatomical structure across the time period, wherein a visualisation corresponding to a particular point in time within the time period comprises
      (i) a volume rendering of the volume of interest of the three-dimensional medical image corresponding to the particular point in time; and
      (ii) a visualisation of the dynamic model at the particular point in time and in the same coordinate system as the volume rendering of the volume of interest.

2. The method of claim 1, wherein the three-dimensional visualisation environment is a virtual reality environment.

3. The method of claim 2, wherein the virtual reality environment comprises at least one input tool, wherein the input tool is realised by a virtual reality controller and allows a user to grab and move an object within the virtual reality environment using hand gestures.

4. The method of claim 2, wherein the virtual reality environment comprises at least one input tool, wherein the input tool is realised by a virtual reality controller and allows a user to adjust parameters used in the visualisation of the dynamic model via gesture control.

5. The method of claim 4, wherein the gesture control is to adjust settings for a threshold used in performing volume rendering on the volume of interest.

6. The method of claim 1, wherein the dynamic anatomical structure is a human heart or animal heart, and the anatomical feature of interest is a part of the human heart or animal heart.

7. The method of claim 6, wherein the dynamic model is a dynamic surface model of one heart chamber or several heart chambers, and the anatomical feature is a heart valve.

8. The method of claim 1, wherein the dynamic model is a dynamic surface model and is derived from the sequence of three-dimensional medical images by segmentation over all three-dimensional medical images, or by segmentation in one three-dimensional medical image and speckle or feature tracking in subsequent three-dimensional medical images.

9. The method of claim 1, wherein a position and/or orientation of the volume of interest is determined across the time period by identifying a corresponding position and/or orientation of the anatomical feature of interest in the dynamic model.

10. The method of claim 1, wherein the volume of interest is determined by identifying a set of landmark points of the anatomical feature in the dynamic model or in the three-dimensional medical images, wherein the landmark points follow the position and/or the shape of the anatomical feature of interest across the time period, and by defining a approximating surface spanning the set of landmark points for each three-dimensional medical image, and by determining the volume of interest as a volume extending above and/or below and/or to a side of the approximation surface.

11. The method of claim 1, wherein providing a three-dimensional visualisation environment comprises:
displaying a computer graphical object corresponding to a medical device in the same coordinate system as the volume rendering of the volume of interest, and wherein the computer graphical object is locked to a position in the dynamic model when the dynamic model and the volume rendered volume of interest are displayed in cine-mode, and
providing an input tool to a user, the input tool allowing the user to move and tilt the computer graphical object corresponding to the medical device in relation to the volume rendering and the visualisation of the dynamic model.

12. The method of claim 11, wherein the medical device comprises an implant.

13. The method of claim 1, wherein providing a three-dimensional visualisation environment comprises:
providing an input tool to a user, the input tool allowing the user to select points within the dynamic anatomical structure and to take measurements on the dynamic anatomical structure.

14. A tangible, non-transitory computer readable medium that stores a computer program comprising program code instructions which, when executed by a processor, enables the processor to perform the method according to claim 1.

15. A user interface configured for visualising a dynamic anatomical structure, the dynamic anatomical structure having been captured on a sequence of three-dimensional medical images spanning a time period, each three-dimensional medical image of the sequence showing the dynamic anatomical structure at a point in time during the time period, the user interface comprising:
a) a three-dimensional visualisation environment configured to provide a three-dimensional visualisation of the dynamic anatomical structure across a time period, and
a processor configured for generating a visualisation corresponding to a particular point in time within the time period, the visualisation comprising:
(i) a display of a volume rendering of a volume of interest within the three-dimensional medical image corresponding to the particular point in time, the volume of interest containing an anatomical feature of interest; and
(ii) a display of a dynamic model of at least a part of the dynamic anatomical structure at the particular point in time and in the same coordinate system as the volume rendering of the volume of interest,
wherein the volume of interest follows a position and/or a shape of the anatomical feature of interest across the time period, and wherein the volume of interest is smaller than a complete field of view of the three-dimensional medical images.

16. The user interface of claim 15, wherein the three-dimensional visualisation environment is a virtual reality environment and the display of the volume rendering of the volume of interest and the dynamic model is a virtual reality display.

17. The user interface of claim 16, wherein the virtual reality environment comprises at least one input tool, wherein the input tool is a virtual reality controller allowing a user to perform one or more of the following actions:
to grab and move an object displayed in the virtual reality environment;
to take measurements on the dynamic anatomical structure;
to adjust parameters used in the visualisation of the dynamic model via gesture control; and
to make annotations to the dynamic anatomical structure, wherein the annotations are locked to a position in the dynamic model when the dynamic model and the volume rendered volume of interest are displayed in cine-mode.

18. The user interface of claim 16, wherein the virtual reality display is provided on a virtual reality headset.

19. The user interface of claim 15, wherein the dynamic model is a dynamic surface model of one heart chamber or several heart chambers, and the anatomical feature is a heart valve.

20. The user interface of claim 15, wherein the dynamic model is a dynamic surface model and is derived from the sequence of three-dimensional medical images by segmentation over all three-dimensional medical images, or by segmentation in one three-dimensional medical image and speckle or feature tracking in subsequent three-dimensional medical images.

* * * * *